J. B. Smith.
Sharpening Saws.
№ 72100    Patented Dec. 10, 1867.

Witnesses
N. N. Mason
Chas. A. Smith

Inventor
J. B. Smith

J. B. Smith.
Sharpening Saws.
N° 72100      Patented Dec. 10, 1867.
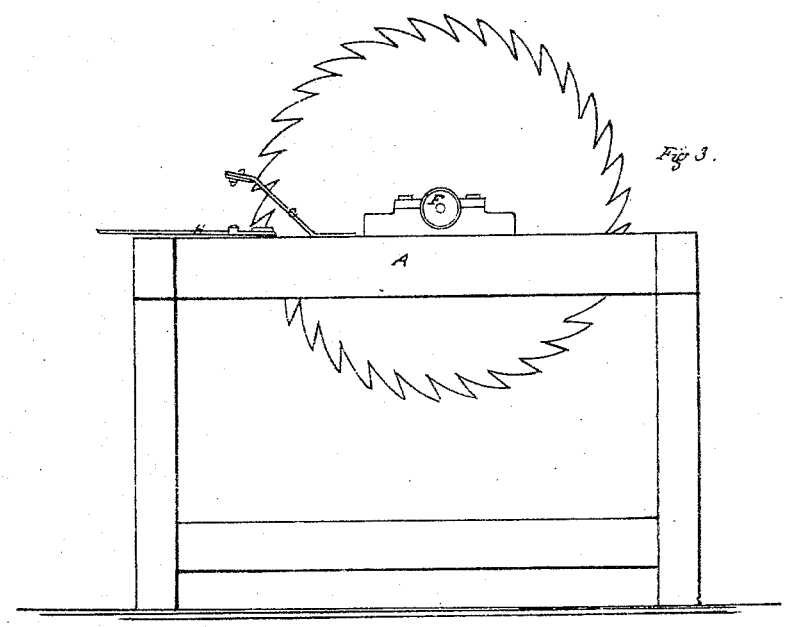
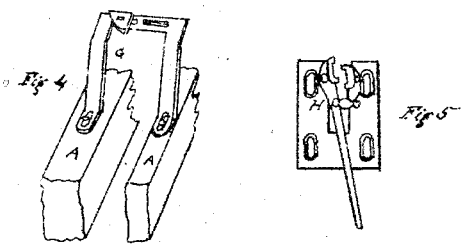
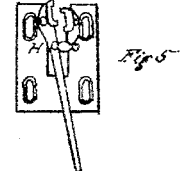
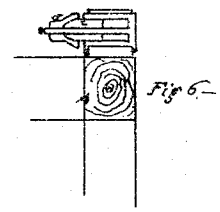
Witnesses
J. N. Mason
Chas. A. Smith
Inventor
J. B. Smith

United States Patent Office.

J. B. SMITH, OF MILWAUKEE, WISCONSIN.

Letters Patent No. 72,100, dated December 10, 1867; antedated December 6, 1867.

---

IMPROVEMENT IN MACHINES FOR SHARPENING SAWS.

---

The Schedule referred to in these Letters Patent and making part of the same.

---

TO ALL WHOM IT MAY CONCERN:

Be it known that I, J. B. SMITH, of the city and county of Milwaukee, and State of Wisconsin, have invented a new and useful Improvement for Sharpening and Setting Saws; and I do hereby declare that the following is a full, clear, and exact description thereof, which will enable those skilled in the art to make and use the same, reference being had to the accompanying drawings, forming part of this specification, in which—

Figure 1:
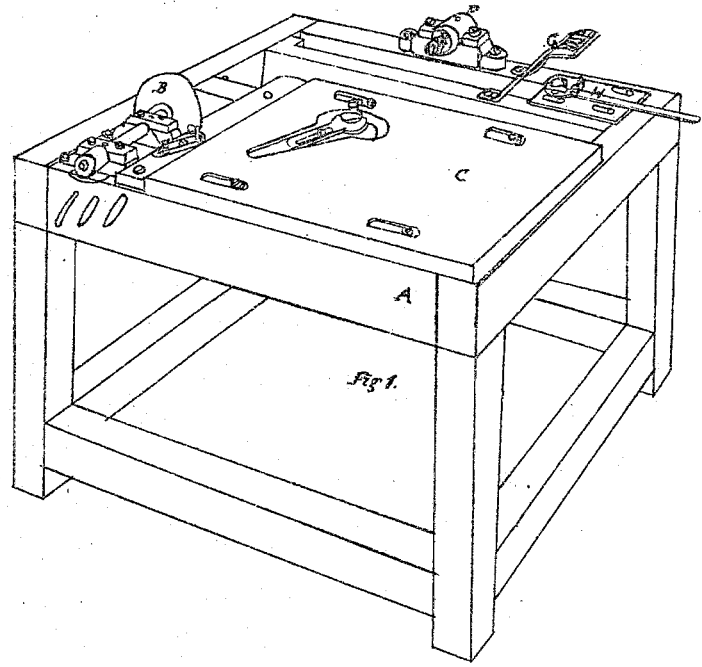
Figure 2:
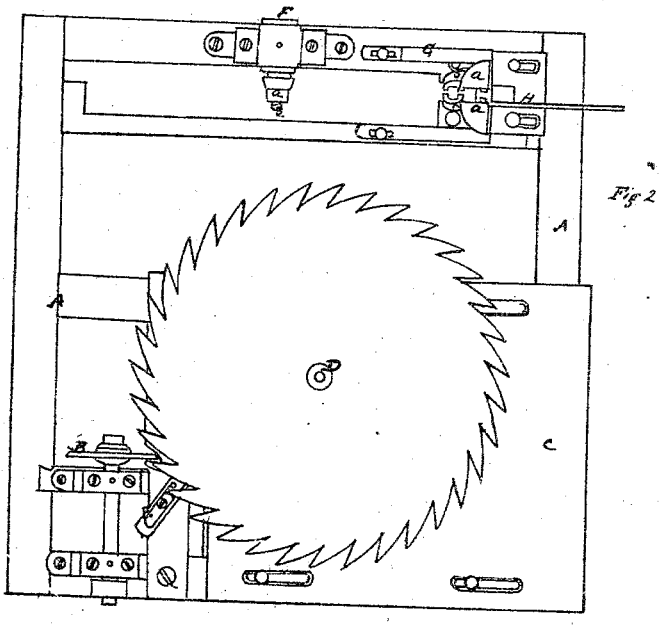

Figure 1 is a perspective view.
Figure 2, top view, showing a saw in position to be sharpened.
Figure 3, end view, with saw in the setting-works.
Figure 4, setting-gauge, with one jaw removed.
Figure 5, setting-levers.
Figure 6, longitudinal section of saw-mandrel.

Similar letters of reference, in each of the figures, indicate corresponding parts.

The nature of my invention consists in machinery arranged to sharpen and set saws in the most perfect and expeditious manner.

A is the frame; B, an emery-wheel on a shaft, with pulley for giving it motion; C, carriage, on which to lay the saw to be sharpened; D, adjustable mandrel or centre, to keep the saw steady, and on which to revolve it; E, adjustable gauge, to regulate the size and length of tooth; F, cone-mandrel, on which to secure the saw for setting it; G, gauge to regulate the set in the saw; H, compound lever, with which to set the saw-teeth; $a\ a$, adjustable jaws to gauge G, to regulate and gauge the set of the saw-teeth; $b$, cone-centre of mandrel F; $c$, spiral spring, to keep the cone-centre out; $d$, countersunk nut; $e$, screw-bolt, over which slips cone-centre $b$, and on which nut $d$ screws, to hold the saw firmly against the shoulder or collar on mandrel. Cone-centre $b$ may be adjusted by lever, screw, or other means, as well as by spring, so that it may fit the eye in any saw.

Operation: Put the saw on mandrel F, then adjust setting-lever H and gauge G to the size of the saw; the jaws $a\ a$ set apart just as far as the kerf the saw is designed to cut, and lever H set so that the outer setting-points shall be near the point of the saw-teeth. Then, when facing the saw, to set a tooth to the right, move the handle of the setting-lever to the right; this will bring the left-hand outer setting-point against the point of the tooth, and the right-hand inner setting-point against the root of the tooth. This will set the tooth more or less, as desired. Then turn the saw on the mandrel till the set tooth comes to the gauge-jaws $a\ a$, and if set right, then set the next tooth to the left, and so on alternately, till all are set, the gauge G being a perfect guide by which to set every tooth to its proper position. Then take the saw from mandrel F, and lay it on carriage C, with its eye over centre mandrel D, said mandrel D first being adjusted so that the teeth of the saw shall have the proper rake and length when operated on by the emery-wheel B, gauge E being set so as to give the requisite size of tooth after the first tooth is formed. Then, as the carriage is moved, the saw is brought in contact with the cutter B, the pin on gauge E coming between the teeth, as shown in fig. 2, and the cutting side of the tooth, between said pin and cutter B, is sharpened by coming in contact with the flat side of said cutter or wheel in motion. Then, as the carriage is drawn back, gradually turn the saw, so that the back of the tooth just sharpened shall press against the gauge-pin; this will bring the back of the next tooth against the bevel side of the wheel B, which will form it exactly like the one pressing against said guide-pin, and so on, forming and sharpening tooth after tooth, till all are completed. Then put the saw again on mandrel F and test its set; if any teeth want resetting, the gauge G will show it. The reason for setting the saw before sharpening, is, that the teeth may be sharpened perfectly square across the saw, making the outer point of each tooth enough longer than the inner point to make the tooth, when cutting, strike the wood square, which would not be the case if the tooth should be sharpened before setting. Centre mandrel D has a cone-centre, and is made like mandrel F, with the exception that it has a square nut on the screw-bolt, small enough for the eye of the saw to pass over it, instead of the countersunk nut $d$.

What I claim as my invention, and desire to secure by Letters Patent, is—

Cutter B, gauge E, and adjustable cone-mandrel D, in combination, substantially as and for the purpose described.

J. B. SMITH.

Witnesses:
J. N. MASON,
CHAS. A. SMITH.